United States Patent [19]

Kubota et al.

[11] Patent Number: 5,231,543

[45] Date of Patent: Jul. 27, 1993

[54] DIGITAL SIGNAL RECORDING/REPRODUCING APPARATUS FOR USE WITH DIGITAL SIGNALS HAVING DIFFERENT TRANSMISSION RATES

[75] Inventors: Yukio Kubota; Keiji Kanota, both of Kanagawa, Japan

[73] Assignee: Sony Corporation, Tokyo, Japan

[21] Appl. No.: 724,209

[22] Filed: Jul. 1, 1991

[30] Foreign Application Priority Data

Jul. 6, 1990 [JP] Japan .................................. 2-179275

[51] Int. Cl.⁵ .................................................. H04N 5/78
[52] U.S. Cl. .................................. 360/36.1; 360/73.08
[58] Field of Search ........ 360/36.1, 36.2, 73.04–73.08, 360/22, 39, 48, 8, 9.1, 10.1, 10.3; 358/343, 339, 328

[56] References Cited

U.S. PATENT DOCUMENTS

| 4,617,599 | 10/1986 | Noguchi et al. | 360/32 |
| 4,791,507 | 12/1988 | Doyama et al. | 360/73.08 |
| 4,796,128 | 1/1989 | Takimoto | 360/64 |

Primary Examiner—David C. Nelms
Assistant Examiner—Que T. Ue
Attorney, Agent, or Firm—William S. Frommer; Alvin Sinderbrand

[57] ABSTRACT

Digital signal recording and reproducing apparatus for recording digital signals in successive tracks of given pitch on a record medium and for reproducing digital signals therefrom. A rotary head assembly including two pairs of head subassemblies angularly separated by approximately 180°, with each subassembly comprised of a pair of heads displaced from each other in a direction parallel to the track pitch, is driven at a predetermined rotation speed to record digital signals selectively supplied at respectively different original transmission rates which exhibit a predetermined ratio. The digital signals are timebase modified to have substantially the same data rate even though their original transmission rates differ from each other; and are coupled to the rotary head assembly. The record medium is driven during a recording mode at respectively different speeds determined by the original transmission rate of the selectively supplied digital signal, whereby the number of tracks recorded on the record medium during a unit time period T (where T is the time for the rotary head assembly to make a predetermined number of rotations) corresponds to the original transmission rate. The record medium is driven during a reproducing mode at the same speed as was used during recording, whereby during the time period T the rotary head assembly reproduces digital signals from twice the number of tracks that had been recorded during that same time period. The reproduced digital signals are recovered substantially without defects at their original transmission rate by way of a memory.

25 Claims, 4 Drawing Sheets

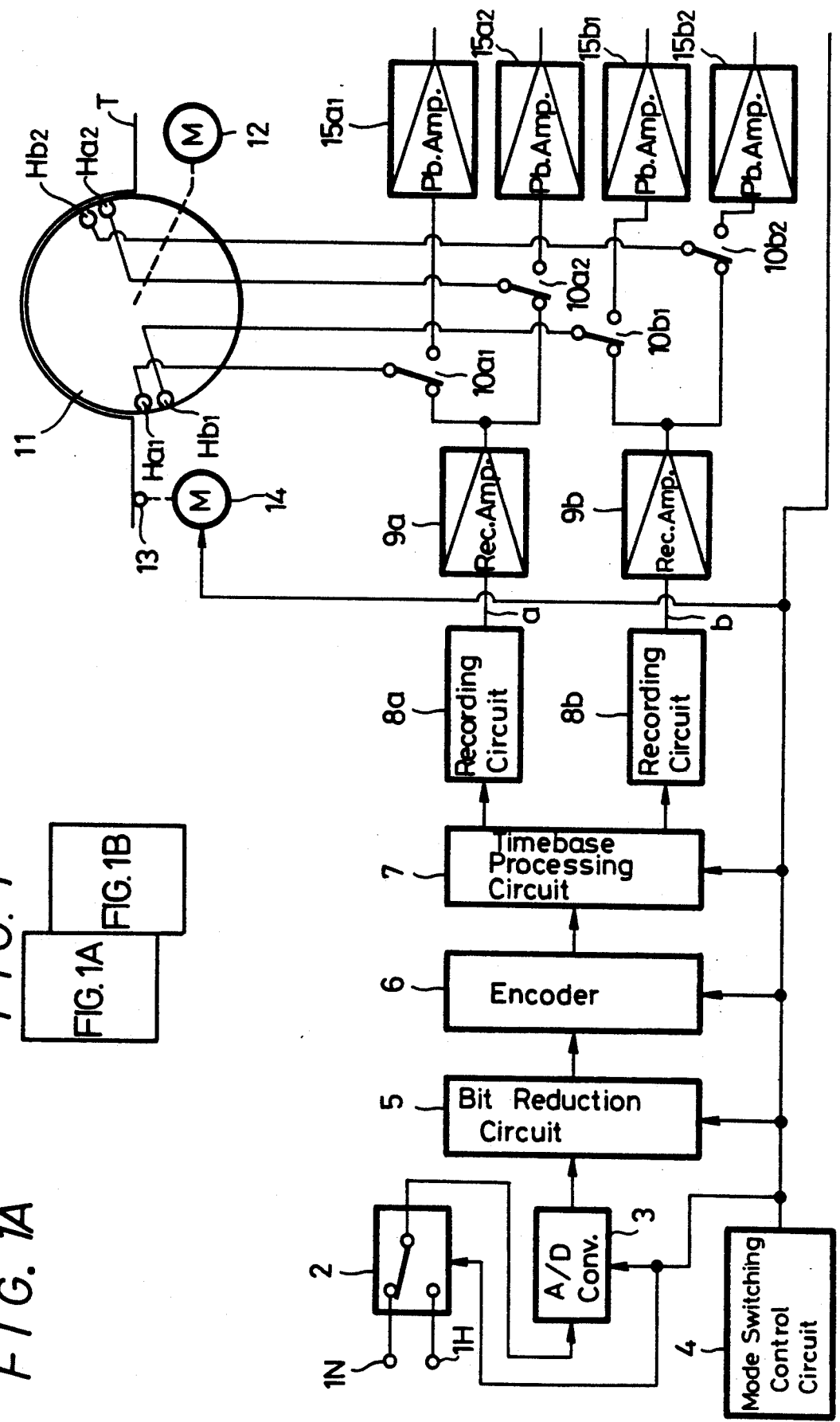

DIGITAL SIGNAL RECORDING/REPRODUCING APPARATUS FOR USE WITH DIGITAL SIGNALS HAVING DIFFERENT TRANSMISSION RATES

BACKGROUND OF THE INVENTION

This invention relates to digital signal recording and reproducing apparatus, and more particularly, to such apparatus which records at a generally constant data rate digital signals that may be supplied at different transmission rates and reproduces those signals without the need for a complex track-following arrangement.

Digital signal recording apparatus have been developed for recording digital signals representative of different types of information. One particular application thereof is to record a video signal in digital form on a moving record medium, such as a magnetic tape, by using a rotary head assembly. In this application, the digital video signals may be of different types, each type exhibiting a different transmission rate, such as an extended play video signal, a normal play video signal having a transmission rate higher than the extended play video signal, and an HDTV video signal having a still higher transmission rate. Notwithstanding these different transmission rates, it is desirable to record such digital video signals at a substantially constant, uniform data rate, thereby simplifying the mechanical assemblies and components, as well as the control electronics used with such recorders. One example of a digital signal recording system operable with video signals exhibiting different transmission rates is described in Japanese laid open patent publication 1-258255.

As described in the aforementioned patent publication, the transmission rates of the extended play, normal play and HDTV signals are in a predetermined ratio, such as the ratio 1:2:4; and the apparatus is operable in an extended play mode, a normal play mode or an HDTV mode to record either the extended play, the normal play or the HDTV signals. To record these different signals, which are selectively supplied, a rotary head assembly comprised of at least two 180° spaced apart subassemblies is used, with each subassembly having two heads displaced from each other in a direction parallel to the pitch of the tracks recorded by those heads. The video signals which are selectively supplied to the rotary head assembly are timebase-compressed to produce recording signals of the same data rate. For example, the extended play digital video signals are timebase compressed to reduce the period thereof by ¼, the normal play digital video signals are timebase compressed to reduce the period thereof by ½ and the HDTV digital video signals are not timebase compressed. This has the effect of increasing the effective transmission rate of the extended play digital video signals by a factor of 4 and increasing the effective transmission rate of the normal play digital video signals by a factor of 2, so that the effective transmission rates of the extended play, normal play and HDTV digital video signals all are equal to the transmission rate of the HDTV signals.

In the aforedescribed Japanese patent publication, the extended play digital video signals are recorded in two tracks substantially simultaneously by one head subassembly while the rotary head assembly makes two complete rotations. The normal play digital video signals are recorded in two tracks substantially simultaneously by one head subassembly while the rotary head assembly makes only one complete rotation. Finally, the HDTV digital video signals are recorded in 4 tracks by both head subassemblies (one subassembly at a time) while the rotary head assembly makes one complete rotation. To achieve this, the magnetic tape on which these tracks are recorded are transported at different speeds during the extended play, normal play and HDTV modes, these different speeds exhibiting the ratio 1:2:4.

In the aforedescribed apparatus, since the signals that are recorded are processed to exhibit the same data rate for the extended play, normal play and HDTV modes, even though the original transmission rates of these signals differ from each other, separate recording electronics for each mode need not be provided. This permits the recording circuitry to be relatively simplified; and the overall reliability of the apparatus is improved. Furthermore, since the rotational speed of the rotary head assembly is constant and need not be changed from one mode to another, the mechanical elements and construction of the assembly likewise may be simplified, thus providing better overall reliability. Moreover, the video signals which are recorded on the magnetic medium are recorded with a substantially constant recording density and, therefore, the recording medium may be used more effectively.

To increase the number of tracks recorded on the magnetic medium, it is desirable to reduce the width of each track which, or course, increases the recording density and, thus, increases the amount of information that may be recorded on a magnetic tape of given length. However, it has been believed heretofore that, if the track width is reduced, special tracking systems must be employed to insure accurate tracking of the individual heads during a playback mode. Thus, it had been thought that ATF, DTF (with a pilot signal) and other tracking techniques must be used. Consistent with this belief that special tracking systems must be provided, it also had been thought that the linearity of each track being recorded must be strictly maintained. This, in turn, requires the rotary head assembly and drive mechanism to be manufactured with limited tolerances and high accuracies. However, the requirement of special tracking control circuits and precise rotary mechanisms results in high manufacturing costs and, in addition, presents a serious risk that the reliability and operating stability of the overall apparatus may face substantial degradation.

OBJECTS AND SUMMARY OF THE INVENTION

Therefore, it is an object of the present invention to provide improved digital signal recording/reproducing apparatus which overcomes the aforementioned disadvantages and defects heretofore experienced and expected.

Another object of this invention is to provide an improved digital signal recording/reproducing apparatus which is of relatively simplified construction and is capable of reproducing a digital signal accurately from tracks of reduced width even when tracking control circuitry is not used.

A further object of this invention is to provide recording and reproducing apparatus capable of recording and reproducing extended play, normal play and HDTV digital video signals without a tracking servo operation.

An additional object of this invention is to provide digital signal recording and reproducing apparatus for use with digital signals selectively supplied with differing transmission rates, wherein those signals are recorded in tracks of reduced width and wherein a tracking servo operation is not needed for good reproduction.

Various other objects, advantages and features of the present invention will become readily apparent from the ensuing detailed description, and the novel features will be particularly pointed out in the appended claim.

In accordance with this invention, digital signal recording and reproducing apparatus are provided for recording digital signals in successive tracks of given pitch on a record medium and for reproducing digital signals from those tracks. The apparatus includes a rotary head assembly comprised of first and second head subassemblies which are angularly separated from each other by about 180°, each subassembly including a pair of heads displaced from each other in a direction parallel to the track pitch, with the rotary head assembly being rotated at a predetermined rotation speed. Digital signals having respectively different original transmission rates which exhibit a predetermined ratio are selectively supplied to the apparatus. A timebase processor modifies the timebase of the supplied digital signals to produce timebase-modified digital signals exhibiting substantially the same data rate even though the original transmission rates of the selectively supplied digital signals may differ from each other. These timebase-modified digital signals are coupled to the rotary head assembly for recording on the record medium which is driven at respectively different speeds depending upon the original transmission rate of the digital signal that is supplied. During a recording operation, the number of tracks recorded on the record medium during a unit time period T (where T is time for the rotary head assembly to made a predetermined number of rotations) is a function of the original transmission rate. During a reproducing mode, the record medium is driven at respectively different speeds corresponding to those used for recording the digital signals, whereby during the time period T, the rotary head assembly reproduces digital signals from twice the number of tracks that were recorded during the time period T. The reproduced digital signals are recovered, by way of a memory, to minimize defects and reproduce the original transmission rate.

BRIEF DESCRIPTION OF THE DRAWINGS

The following detailed description, given by way of example and not intended to limit the present invention solely thereto, will best be understood in conjunction with the accompanying drawings in which.

DETAILED DESCRIPTION OF A PREFERRED EMBODIMENT

Figure 1B:
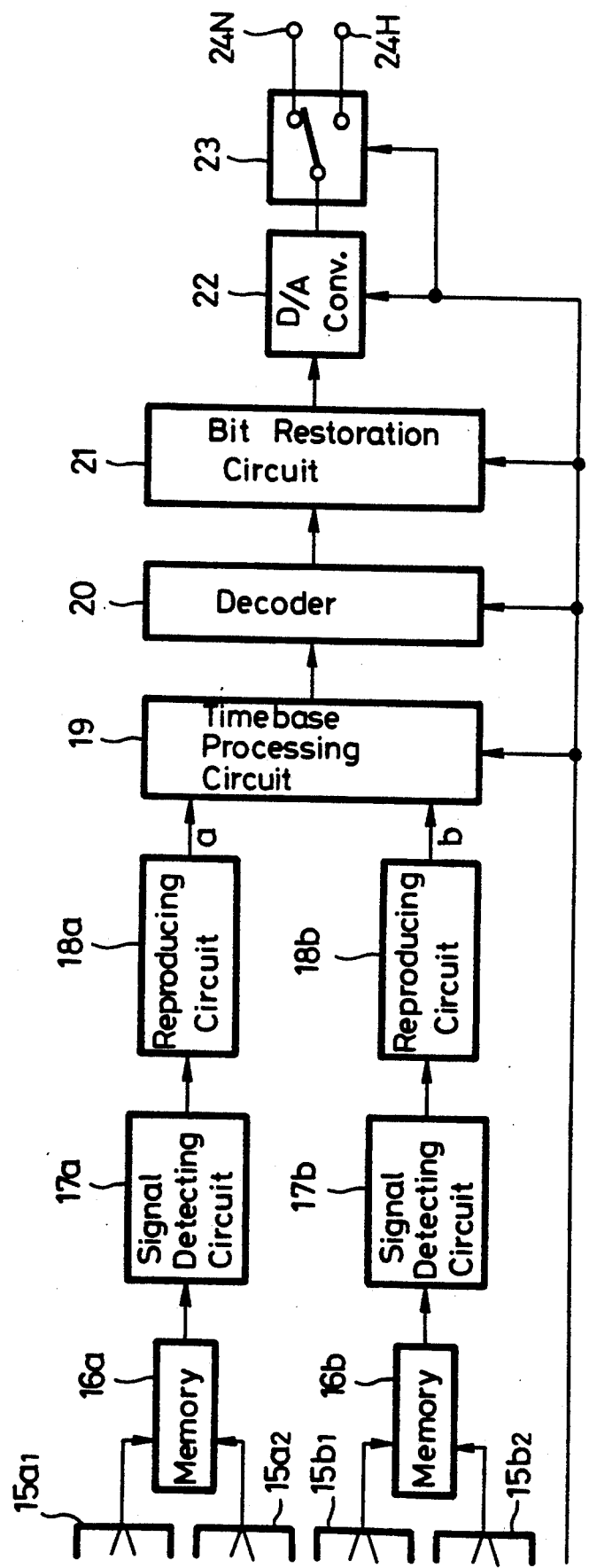
FIG. 1, which is formed of FIGS. 1A and 1B, is a block diagram of recording and reproducing apparatus which embodies the present invention.

Referring now to the drawings, FIG. 1A is a block diagram of digital signal recording apparatus with which the present invention finds ready application. Input terminals 1N and 1H are adapted to receive video signals, such as analog NTSC signals, HDTV signals, or the like. In the preferred embodiment, conventional video signals, such as NTSC video signals, are supplied to input terminal 1N and HDTV video signals are supplied to input terminal 1H. Input terminals 1N and 1H are selectively coupled to an analog-to-digital (A/D) converter 3 by way of a selector switch 2. Depending upon the operating mode of the illustrated apparatus, either input terminal 1N or input terminal 1H is coupled to the A/D converter. A selector control signal is coupled to the selector switch from a mode switching control circuit 4, which may comprise a microprocessor or other controlling circuit, to establish the condition of switch 2. It will be appreciated from the forthcoming description that the illustrated apparatus is adapted to operate in a normal play recording mode, wherein normal video signals (such as an NTSC signal) are received and recorded in a "normal" recording mode, an extended play recording mode wherein a conventional video signal, such as an NTSC signal, is recorded in a reduced length of record medium such that a smaller amount of record medium is needed to record a video signal of given duration, and an HDTV recording mode wherein an HDTV video signal is received and recorded on the record medium. As already described, the preferred record medium is magnetic tape.

The selector control signal produced by mode switching control circuit 4 disposes selector switch 2 in a condition to couple input terminal IN to A/D converter 3 during the normal play recording and extended play recording modes, whereas the selector switch is conditioned to couple input terminal 1H to the A/D converter during the HDTV recording mode. It will be recognized that the transmission rates of the respective extended play, normal play and HDTV video signals differ from each other. Typically, these transmission rates exhibit the ratio 1:2:4, wherein the transmission rate of the extended play video signal is less than the transmission rate of the normal play video signal which, in turn, is less than the transmission rate of the HDTV video signal. A/D converter 3 samples the input video signal selectively supplied thereto by selector switch 2 at respectively different sampling rates, depending upon the transmission rate of the input video signal, that is, depending upon the particular recording mode of the illustrated apparatus. The sampling rate of A/D converter 3 is established by mode switching control circuit 4 to be compatible with the transmission rate of the video signal supplied thereto or the type of recording mode to be carried out. Thus, the A/D converter digitizes the input video signal to produce digital video signals of respectively different transmission rates. For the purpose of the present discussion, A/D converter 3 operates to produce extended play, normal play and HDTV digital video signals.

It is preferred to perform digital compression on the digitized video signal produced by A/D converter 3. Accordingly, a bit reduction circuit 5 is coupled to the A/D converter to reduce the number of bits included in the digital video signal. The bit-reduced digital signals are coupled, in turn, to an error correction encoder 6 which, for example, adds a parity bit to the bit-reduced digital signal. Other error correction encoding techniques may be used, if desired Nevertheless, the transmission rate of the encoded digital signal depends upon the recording mode of the apparatus, as represented by the control signal produced by mode switching control circuit 4. In the preferred embodiment, the extended play, normal play and HDTV digital video signals supplied from encoder 6 exhibit transmission rates in the ratio 1:2:4. Thus, the transmission rate of the HDTV digital video signal is four times the transmission rate of the extended play digital video signal, and the transmission rate of the normal play digital video signal is twice that of the extended play digital video signal.

The encoded digital signal produced by encoder 6, and exhibiting a respective transmission rate as aforementioned, is timebase compressed by a timebase processing circuit 7 coupled to the encoder. Thus, the period of the particular digital signal supplied to the timebase processing circuit is reduced by a factor determined by the original transmission rate thereof, thereby producing digital signals of substantially the same, constant data rate. In the preferred embodiment, the period of the extended play digital video signal is timebase compressed to a period ¼ its original period (i.e. it is compressed by a factor of 4), the normal play digital video signal is timebase compressed to a period that is ½ its original period (i.e. it is timebase compressed by a factor of 2) and the period of the HDTV digital video signal is reduced by a factor of 1. As a result, the effective data rate of the extended play digital video signal is increased from an original transmission rate of ¼ the HDTV transmission rate so as to be equal to the HDTV transmission rate; and, similarly, the effective data rate of the normal play digital video signal is increased from ½ the transmission rate of the HDTV digital video signal to a rate that also is equal to the HDTV transmission rate. Consequently, timebase processing circuit 7 functions to produce digital video signals of substantially uniform, constant data rate. Accordingly, notwithstanding the particular recording mode of the illustrated apparatus, the digital signals produced by timebase processing circuit 7 all exhibit substantially the same data rate.

The timebase-compressed digital signals produced by timebase processing circuit 7 are supplied to recording circuits 8a and 8b, alternately by, for example, field or other interval recorded in a record track. Each recording circuit may be of substantially identical construction, and each is adapted to convert the digital signal supplied thereto to a conventional recording code normally used in digital signal recorders for recording on, for example, a magnetic medium, such as magnetic tape. The signals produced by recording circuits 8a and 8b are referred to as recording signals a and b, respectively, and these recording signals are amplified by recording amplifiers 9a and 9b, respectively, from which they are supplied to a rotary head assembly 11 by way of recording/reproducing switches 10 for recording on a magnetic tape. The rotary head assembly is illustrated as being comprised of a pair of head subassemblies, each subassembly being shown more particularly in FIG. 2. In one embodiment, each subassembly is comprised of a pair of recording/reproducing heads Ha and Hb having different azimuth angles. The two subassemblies are angularly disposed from each other by 180° and are rotated by a drive motor 12 coupled thereto.

Figure 3A:
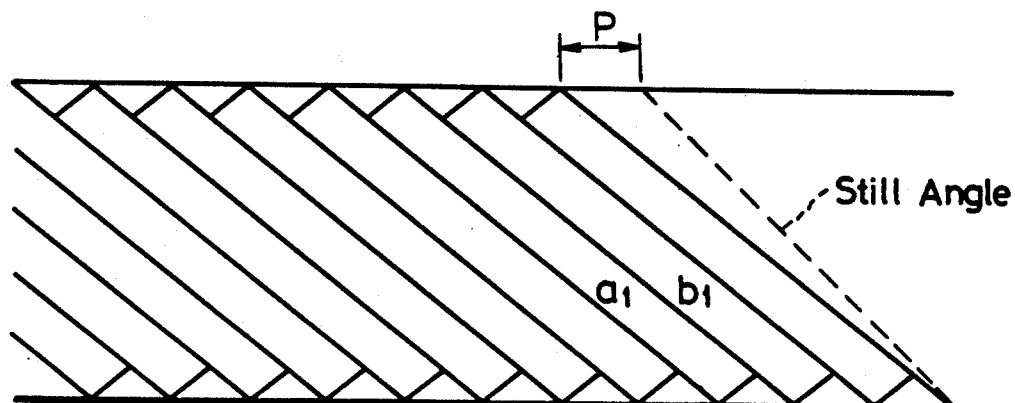
FIGS. 3A-3C are schematic representations of track patterns which are recorded with input digital signals having differing original transmission rates.
Figure 3B:
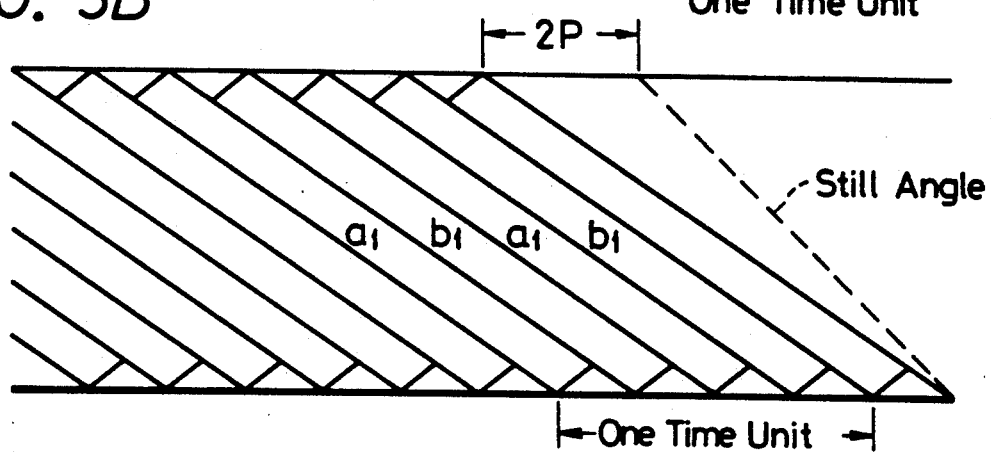
Figure 3C:
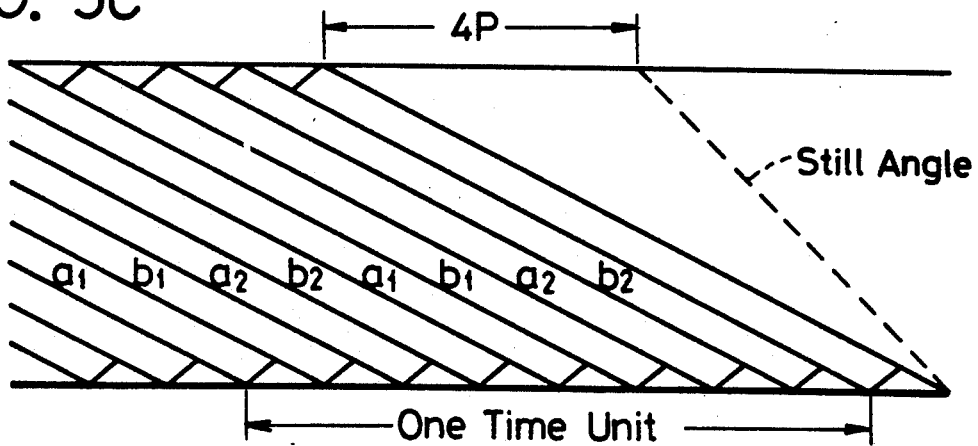
Figure 2:
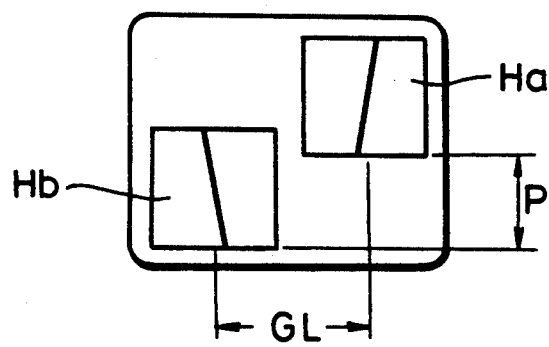
FIG. 2 is a schematic representation of a head subassembly used in the recording/reproducing apparatus shown in FIG. 1.

As shown in FIG. 2, heads Ha and Hb are displaced from each other in a direction parallel to the pitch of P of the tracks recorded thereby. Stated otherwise, these heads exhibit a track pitch offset P. In addition, heads Ha and Hb are displaced from each other in the track scanning direction by an amount GL. This displacement GL enables both heads Ha and Hb to commence the scanning of adjacent tracks substantially simultaneously, even though the tracks themselves are longitudinally displaced from each other, as shown in FIGS. 3A–3C. In any event, it will be appreciated that each pair of heads Ha and Hb makes a pass across the magnetic tape during one rotation of rotary head assembly 11. For convenience, heads Ha and Hb included in one subassembly are identified as heads $Ha_1$ and $Hb_1$, and the heads included in the other subassembly are identified as heads $Ha_2$ and $Hb_2$.

The rotary head assembly is rotatably driven by drive motor 12 at a substantially constant rate, notwithstanding the different recording modes with which the apparatus may be used and the different original transmission rates of the input digital signals supplied by A/D converter 3. However, the magnetic tape is driven about a guide drum by a capstan 13 which, in turn, is driven by a tape drive motor 14 whose speed is determined by mode switching control circuit 4. More particularly, tape drive motor 14 drives the magnetic tape at speeds in the ratio 1:2:4 during extended play, normal play and HDTV recording modes, respectively. Although the data rates of the recording signals a and b produced by recording circuits 8a and 8b are substantially the same for all recording modes, the density with which the digital video signals are recorded varies as a function of the original transmission rate thereof. Thus, during an HDTV recording mode, the magnetic tape is driven at 4 times the speed used to record an extended play digital video signal; and during a normal play recording mode, the magnetic tape is driven at twice the speed used to record the extended play digital video signals. It is seen, then, that the transport speed of magnetic tape T varies in the ratio of 1:2:4 to record extended play, normal play and HDTV digital video signals, respectively.

If a unit time period T represents the time for the rotary head assembly 11 to make two complete rotations, during the extended play recording mode two tracks of the digital video signals are recorded by, for example, heads $Ha_1$ and $Hb_1$ during only one pass of these heads across the magnetic tape during the unit time period T. During the normal play recording mode, two tracks of digital video signals are recorded by, for example, $Ha_1$ and $Hb_1$ during each rotation of the rotary head assemblies, resulting in the recording of four tracks during the unit time period T; and during the HDTV recording mode, two tracks are recorded by heads $Ha_1$ and $Hb_1$, followed by two tracks recorded by heads $Ha_2$ and $Hb_2$ during one rotation of the head assembly, resulting in the recording of eight tracks during the unit time period T. That is, during the extended play recording mode, only one pair of heads records digital video signals during alternate rotations of the rotary head assembly; during the normal play recording mode, only one pair of heads records digital video signals, but these are recorded during each rotation of the rotary head assembly; and during the HDTV recording mode, each pair of heads records a respective pair of tracks of digital video signals during each rotation of the rotary head assembly. Hence, during the unit time period T (i.e. during two rotations of the rotary head assembly), two tracks of extended play digital video signals, four tracks of normal play digital video signals, or eight tracks of HDTV digital video signals are recorded. It is appreciated, then, that during a recording mode, the number of tracks which are recorded during the unit time period T corresponds to the original transmission rate of the digital signals, and this number of tracks exhibits the ratio 1:2:4.

In the preferred embodiment, the magnetic tape is wrapped about a rotary head drum over an angular extent of about 180°. In this arrangement, only one pair of heads at a time is in magnetic contact with the magnetic tape and, thus, only one pair of heads at a time operates to record digital signals.

The track forming operation in the different recording modes is best appreciated by referring to FIGS. 3A-3C. FIG. 3A represents the tracks which are recorded during the extended play recording mode. In this mode, tape drive motor 14 operates to transport the magnetic tape at a speed such that the tape is advanced by an amount equal to one track pitch P during the time that the rotary head assembly makes one complete rotation. Accordingly, if it is assumed that head $Ha_1$ records track $a_1$ and head $Hb_1$ records track $b_1$, then, during the first pass of these heads across the magnetic tape, tracks $a_1$ and $b_1$ are recorded. As mentioned above, no signals are supplied to heads $Ha_2$ and $Hb_2$ when these heads pass across the tape. Now, when heads $Ha_1$ and $Hb_1$ rotate to make the next pass across the tape, head $Ha_1$ is aligned with track $b_1$. To prevent the digital signals recorded in track $b_1$ from being overwritten, digital signals are inhibited (not shown) from being supplied to these heads during this rotation. Hence, digital signals are supplied to only one pair of heads (assumed herein to be heads $Ha_1$ and $Hb_1$) only during alternate rotations of the rotary head assembly. Therefore, only two tracks $a_1$ and $b_1$ are recorded (with track pitch P) during the unit time period T (where T is the time for rotary head assembly 11 to make two complete rotations).

During the normal play recording mode, let it be assumed that heads $Ha_1$ and $Hb_1$ record tracks $a_1$ and $b_1$, respectively, on magnetic tape T, as shown in FIG. 3B. Mode switching control circuit 4 controls tape drive motor 14 to drive the magnetic tape at twice the extended play transport speed. Accordingly, during one pass of heads $Ha_1$ and $Hb_1$ across tape T, tracks $a_1$ and $b_1$ are respectively recorded thereby. At the end of this pass, heads $Ha_2$ and $Hb_2$ begin to pass across the tape and the recording of digital signals by these heads is inhibited. Since the tape is transported at twice the extended play transport speed, the tape is advanced by a distance equal to 2P during the time for one complete rotation of the rotary head assembly. Hence, when heads $Ha_1$ and $Hb_1$ commence their next pass across the tape, the tape is sufficiently advanced to permit the next pair of tracks to be recorded. As shown in FIG. 3B, heads $Ha_1$ and $Hb_1$ record successive pairs of tracks $a_1$ and $b_1$, respectively, at each rotation of the rotary head assembly. Accordingly, during the unit time period T (equal to two rotations of the rotary head assembly), four tracks $a_1$, $b_1$, $a_1$, $b_1$ are recorded.

During the HDTV recording mode, mode switching control circuit 40 controls tape drive motor 14 to advance the magnetic tape at four times the extended play transport speed. Hence, the tape is transported a distance equal to 4P for each complete rotation of the rotary head assembly. Accordingly, when heads $Ha_1$ and $Hb_1$ make one pass across tape T, tracks $a_1$ and $b_1$ are respectively recorded thereby. At the end of this pass, heads $Ha_2$ and $Hb_2$ commence a pass across the tape, and these heads record tracks $a_2$ and $b_2$, respectively. Since the tape is transported at a speed which moves it a distance 4P, these four tracks are recorded in succession, as shown in FIG. 3C. Therefore, for each complete rotation of the rotary head assembly, tracks $a_1$, $b_1$, $a_2$ and $b_2$ are recorded by heads $Ha_1$, $Hb_1$, $Ha_2$ and $Hb_2$, respectively. This operation is repeated for each rotation of the rotary head assembly. It will, therefore, be seen from FIG. 3C that during the unit time period T (where T is the time for the rotary head assembly to make two complete rotations), eight successive record tracks are recorded.

To represent the different tape transport speeds, FIGS. 3A-3C illustrate, in broken line, the trace of a head subassembly when tape T is stopped, thereby recording and reproducing a still image. This trace is referred to as the "still angle", and it is seen that the angle at which the tracks are recorded relative to the "still angle" increases as the tape transport speed increases. It is also seen that as the tape transport speed increases while the rotary head speed remains constant, the number of tracks which may be recorded during the unit time period T also increases.

Turning now to FIG. 1B, there is illustrated a block diagram of digital signal reproducing apparatus which incorporates the present invention. For convenience, it is assumed that the same rotary head assembly 11 that was used to record the digital signals on the magnetic tape is used to reproduce those signals. It will be appreciated, however, that a different assembly, such as that found in a different machine, may be used to reproduce these previously recorded digital signals. Accordingly, the subassemblies comprised of heads $Ha_1$, $Hb_1$ and $Ha_2$, $Hb_2$ are rotatably driven by motor 12 to scan the tracks having the pattern shown, for example, in FIG. 3A or 3B or 3C. The signals reproduced by these heads are coupled by way of recording/reproducing switches 10 to playback amplifiers $15a_1$, $15a_2$, $15b_1$ and $15b_2$, respectively. As shown in FIG. 1A, when the recording/reproducing switches are disposed in the reproducing mode, digital signals picked up from magnetic tape T by head $Ha_1$ are coupled by switch $10a_1$ to playback amplifier $15a_1$. Similarly, digital signals picked up by head $Hb_1$ are coupled by switch $10b_1$ to playback amplifier $15b_1$, digital signals picked up by head $Ha_2$ are coupled by switch $10a_2$ to playback amplifier $15a_2$, and digital signals picked up by head $Hb_2$ are coupled by switch $10b_2$ to playback amplifier $15b_2$. Thus, the digital signals picked up by the respective heads are amplified by individual playback amplifiers. Preferably, each amplifier exhibits an equalizing characteristic to provide equalization to the reproduced digital signals.

Amplifiers $15a_1$ and $15a_2$ are coupled to a memory 16a and amplifiers $15b_1$ and $15b_2$ are coupled to a memory 16b. The capacity of each of these memories is sufficient to store a field interval of digital video signals and, preferably, at least one frame of digital video signals is stored thereby. In the event that portions of the reproduced digital video signals are defective, as may be caused by dropout, interference, or the like, such defective portions may be replaced by corresponding portions in the next scan of the heads across the tape, or in the next field or frame reproduced from the tape. Thus, defects are compensated by information recovered during the next scan or the next field or frame. The inherent redundancy of television signals makes such compensation from the next field or frame substantially unnoticeable.

The digital video signals stored in memories 16a and 16b, including the compensated digital signals, are read therefrom to signal detecting circuits 17a and 17b, respectively. These signal detecting circuits operate to detect dropouts and defects and cooperate with memories 16a and 16b to effect the aforementioned compensation. The outputs from the signal detecting circuits are seen to be similar to digital video signals a and b produced by recording circuits 8a and 8b of FIG. 1A, and these digital video signals are supplied to reproducing circuits 18a and 18b, respectively, whereat the conventional recording code that had been used to record the digital signals on the magnetic tape is decoded. Thus, these signals produced by reproducing circuits 18a and 18b are in a form similar to that which were supplied to recording circuits 8a and 8b during the recording operation.

From the description of FIG. 1A, it will be appreciated that the signals reproduced by reproducing circuit 18a are timebase-compressed and, depending upon whether extended play, normal play or HDTV digital video signals are being reproduced, such signals are recovered from tracks $a_1$ (as shown in FIGS. 3A and 3B) or from tracks $a_1$ and $a_2$ (as shown in FIG. 3C). Similarly, the signals reproduced by reproducing circuit 18b are timebase-compressed and, depending upon whether the apparatus is operated in an extended play, normal play or HDTV reproducing mode, such signals are recovered from tracks $b_1$ (as shown in FIGS. 3A and 3B) or from tracks $b_1$ and $b_2$ (as shown in FIG. 3C). These digital signals are supplied by the reproducing circuits to timebase processing circuit 19 which operates to restore the original period of the digital signals that had been recorded. For example, the period of the extended play digital video signals is expanded by a factor of 4, the period of the normal play digital video signals is expanded by a factor of 2 and the period of the HDTV digital video signals is expanded by a factor of 1 (i. e. it is not modified). Hence, whereas the original transmission rates exhibited the ratio 1:2:4, the timebase-expansion of these digital signals is in the ratio of 4:2:1.

In addition, the timebase processing circuit serves to multiplex the digital signals recovered by heads $Ha_1$ and $Hb_1$ as well as those recovered by heads $Ha_2$ and $Hb_2$ to produce a single channel of digital signals. It is seen that timebase processing circuit 19 is coupled to mode switching control circuit 4 to have the timebase-expansion factor thereof determined by the operating mode selected by the mode switching control circuit. Hence, when the reproducing apparatus operates in the extended play reproducing mode, timebase processing circuit 19 is controlled to expand the period of the digital signals supplied thereto by a factor of 4. Analogously, when the reproducing apparatus operates in the normal play mode, timebase processing circuit 19 is controlled to expand the period of the digital signals supplied thereto by a factor of 2. Preferably, when the apparatus operates in the HDTV mode, the timebase processing circuit does not modify the period of the digital signals.

It will be seen that the single channel digital signal produced by timebase processing circuit 19 exhibits a transmission rate substantially equal to the original transmission rate at which that signal had been supplied for recording. In the example discussed herein, the original transmission rates exhibit the ratio 1:2:4, wherein the transmission rate of the normal play digital signal is twice that of the extended play digital video signal, and the transmission rate of the HDTV digital video signal is four times that of the extended play digital video signal. The digital signals having restored original transmission rates are supplied from timebase processing circuit 19 to an error correction decoder 20 which carries out an error correction operation based upon the parity bit added to the digital signal by error correction encoder 6 (FIG. 1A). More generally, decoder 20 is compatible with the error correction encoding technique used by encoder 6 and operates to correct, or remove, errors that may be present in the reproduced digital signal The error corrected digital signal produced by decoder 20 is coupled to a bit restoration circuit 21 which is compatible with aforedescribed bit reduction circuit 5. It is recalled that the bit reduction circuit functioned to perform digital compression by reducing the number of bits included in the digital video signal. Bit restoration circuit 21 operates in a reciprocal manner to restore those bits which had been reduced. Thus, the bit restoration circuit may be thought of as performing digital expansion; and this expansion is controlled by mode switching control circuit 4 as a function of the particular reproducing mode in which the apparatus operates. In one embodiment, the extended play, normal play and HDTV digital signals are uniquely digitally expanded by the bit restoration circuit.

The bit-expanded digital signals are converted from digital form to analog form by a digital-to-analog (D/A) converter 22. The rate at which D/A converter 22 operates is controlled by mode switching control circuit 4 and varies as a function of the reproducing mode of the illustrated apparatus. For example, each of the expanded play, normal play and HDTV digital video signals is converted to analog form at a respectively different rate, depending upon the original transmission rate of those signals. The resultant analog signals are supplied to one of two output terminals 24N and 24H by a selector switch 23. The selector switch is controlled by the mode switching control circuit and operates to couple the analog output from D/A converter 22 to output terminal 24N when the reproducing apparatus operates in the extended play or normal play mode; whereas the analog signals produced by the D/A converter are coupled by switch 23 to output terminal 24H when the apparatus operates in the HDTV mode. Thus, conventional video signals, such as an NTSC video signal, whether recorded in normal or extended play modes, are coupled to output terminal 24N; whereas HDTV video signals are coupled to output terminal 24H. Stated more generally, video signals exhibiting a relatively lower transmission rate are coupled by selector switch 23 to output terminal 24N, whereas video signals exhibiting a higher transmission rate are coupled to output terminal 24H. This selection in the output terminal to which the video signals are coupled is intended to be compatible with the additional apparatus (not shown) coupled to these terminals.

By using the reproducing apparatus illustrated in FIG. 1B, and by recording the digital signals in the manner discussed above to produce the track patterns shown in FIGS. 3A, 3B and 3C, the playback heads are adapted to recover the recorded digital signals without requiring sophisticated tracking control arrangements. This is because multiple tracks are reproduced during the unit time period T (as before, T is the time for the rotary head assembly to make two complete rotations), thus providing multiple scans of the same track to assure good reproduction therefrom. That such accurate reproduction of digital signals may be obtained without requiring a complicated tracking control arrangement is described in U.S. Pat. Nos. 4,774,605 and 4,875,111. The techniques described in these patents may be adopted herein, yet it will be appreciated that in accordance with the present invention, there is no need to rotate the rotary head assembly during a reproducing mode at twice the rotary speed used during a recording mode. Rather, the rotary head assembly is rotated at the same, constant rate for both modes.

Figure 4A:
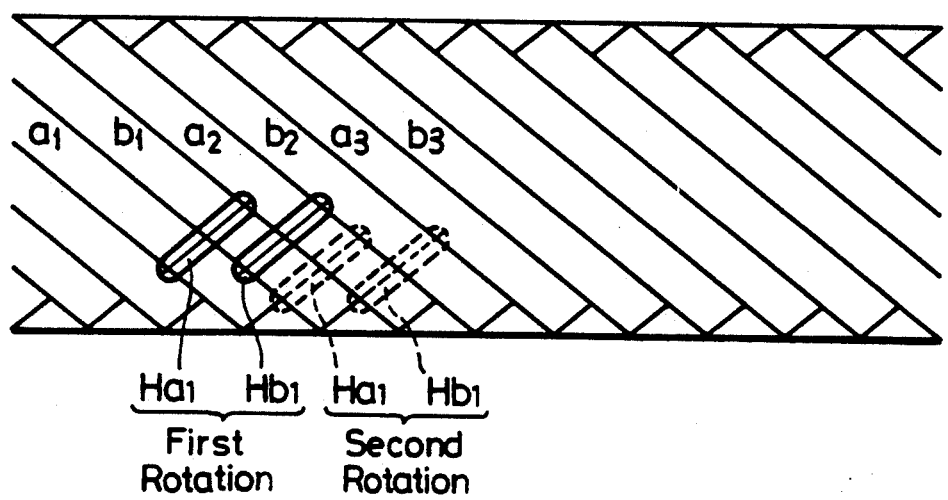
FIGS. 4A and 4B are schematic representations of the positions of the playback heads relative to the tracks in which are recorded different types of digital signals.

The advantages attained by the present invention now will be described in conjunction with FIGS. 4A and 4B which are schematic representations of the scanning of the playback heads across the tracks recorded on the magnetic tape as the tape is driven at different speeds for different reproducing modes. Initially, reference is made to FIG. 4A wherein tracks $a_1$, $b_1$, $a_2$, $b_2$, etc. had been recorded in the extended play recording mode and now are reproduced in the extended play reproducing mode by the two head subassemblies. FIG. 4A also illustrates heads $Ha_1$ and $Hb_1$ as they scan successive tracks during successive rotations of the rotary head assembly. From the discussions set forth hereinabove with respect to FIG. 3A, it is appreciated that tracks $a_1$, $b_1$, $a_2$ and $b_2$ are recorded by heads $Ha_1$ and $Hb_1$ during alternate rotations of the rotary head assembly; and heads $Ha_2$ and $Hb_2$ are inhibited from recording signals when they pass across the magnetic tape.

During the extended play reproducing mode, magnetic tape T is transported at the same speed as was used to record these signals. Accordingly, the tape is transported by a distance equal to one track pitch P during the interval that the rotary head assembly makes one complete rotation. Let it be assumed that heads $Ha_1$ and $Hb_1$ initially are positioned to reproduce the digital signals recorded in tracks $a_1$ and $b_1$, respectively. After these heads pass across the magnetic tape, the rotary head assembly will have completed one-half of a complete rotation and the tape will have been advanced by P/2. Thus, head $Ha_2$ now is positioned to reproduce the signals recorded in tracks $a_1$ or $b_1$ and head $Hb_2$ is positioned to reproduce the signals recorded in tracks $b_1$ or $a_2$. By reason of the phenomenon of azimuth loss, the signals recorded in track $b_1$ are not reproduced by head $Ha_2$ and, similarly, the signals recorded in track $a_2$ are not reproduced by head $Hb_2$ Consequently, during this pass of heads $Ha_2$ and $Hb_2$ across the tape, the signals recorded in tracks $a_1$ and $b_1$ are reproduced thereby, respectively. Thus, during this one complete rotation of the rotary head assembly, heads $Ha_1$ and $Hb_1$ reproduce the digital signals recorded in tracks $a_1$ and $b_1$; and heads $Ha_2$ and $Hb_2$ likewise reproduce the digital signals recorded in tracks $a_1$ and $b_1$, respectively. Tracks $a_1$ and $b_1$ thus are effectively scanned twice during this rotation of the rotary head assembly.

Now, at the beginning of the next rotation of the rotary head assembly, the magnetic tape will have been advanced sufficiently to position head Ha over tracks $b_1$ and $a_2$; and head $Hb_1$ will be positioned over tracks $a_2$ and $b_2$. Because of azimuth loss, head $Ha_1$ reproduces the signals from track $a_2$ only and head $Hb_1$ reproduces the signals from track $b_2$ only. Hence, during this half rotation of the rotary head assembly, the digital signals recorded in tracks $a_2$ and $b_2$ are reproduced by heads $Ha_1$ and $Hb_1$. As heads $Ha_2$ and $Hb_2$ are positioned to commence their scanning of the magnetic tape, head $Ha_2$ reproduces digital signals from track $a_2$ and head $Hb_2$ reproduces digital signals from track $b_2$. Thus, during this second complete rotation of the rotary head assembly, the digital signals recorded in tracks $a_2$ and $b_2$ are reproduced by heads $Ha_1$ and $Hb_1$, respectively, and also by heads $Ha_2$ and $Hb_2$, respectively.

It is recalled that, when extended play digital signals are recorded, only two tracks (e. g. $a_1$ and $b_1$) are recorded during unit time period T (where T is the time for the rotary head assembly to make two complete rotations). However, during this same time period T when the apparatus operates to reproduce the extended play digital signals, twice the number of tracks ($a_1$, $b_1$, $a_2$ and $b_2$) are reproduced. Moreover, each pair of tracks is reproduced twice (once by heads $Ha_1$ and $Hb_1$ and once again by heads $Ha_2$ and $Hb_2$) during each complete rotation of the rotary head assembly. This permits accurate reproduction of the digital signals without requiring a complex and sophisticated track following arrangement.

It is appreciated that, as each head subassembly reproduces digital signals from respective tracks, those digital signals are written into memories $16_a$ and $16_b$. If any such digital signals are defective, as may be caused by dropout or the like, during one pass of one head subassembly, those defective portions may be replaced by non-defective portions recovered from the same, or next adjacent tracks, during the pass of the other head subassembly.

The foregoing discussion has assumed that both subassemblies reproduce digital signals from the tracks scanned thereby. If desired, only one subassembly can be used to reproduce digital signals and the other can be inhibited, as is done during a recording mode. For example, only heads $Ha_1$ and $Hb_1$ may be used to reproduce digital signals from tracks $a_1$ and $b_1$ during one rotation of the rotary head assembly and then, during the next rotation, these same heads may be used to reproduce signals from tracks $a_2$ and $b_2$. Still, during the unit time period T, digital signals Will be reproduced from twice the number of tracks than had been recorded during this unit time period T. This is because, during the recording operation, only tracks $a_1$ and $b_1$ are recorded during time period T; whereas during reproduction, digital signals from tracks $a_1$, $b_1$, $a_2$ and $b_2$ are reproduced during time period T, even if heads $Ha_2$ and $Hb_2$ are disabled.

Figure 4B:
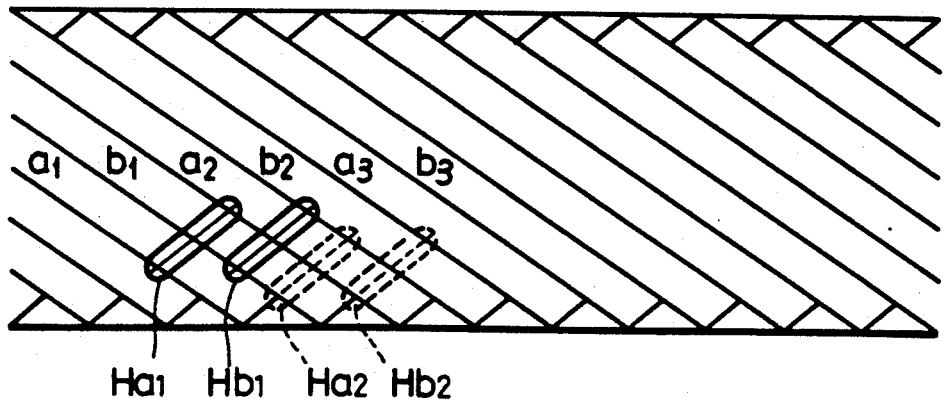

Turning now to FIG. 4B, it is assumed that digital signals are recorded in tracks $a_1$, $b_1$, $a_2$, $b_2$, $a_3$, $b_3$, etc. by, for example, heads $Ha_1$ and $Hb_1$ only, during a normal play recording mode. That is, and consistent with the example discussed above in conjunction with FIG. 3B, it is assumed that only heads $Ha_1$ and $Hb_1$ record digital signals in tracks $a_1$ and $b_1$ during one rotation of the rotary head assembly, whereby the magnetic tape is advanced by a distance equal to twice the track pitch 2P, and these same heads $Ha_1$ and $Hb_1$ next record digital signals in tracks $a_2$ and $b_2$ during the next following rotation of the rotary head assembly. Thus, during a normal play recording mode, heads $Ha_2$ and $Hb_2$ are not used to record digital signals.

In the normal play reproduction mode, it is assumed that the magnetic tape is advanced by a distance 2P during the interval needed for the rotary head assembly to make one complete rotation. Let it be assumed that, at the beginning of a rotation, heads $Ha_1$ and $Hb_1$ are positioned over tracks $a_1$ and $b_1$, respectively, to reproduce the digital signals recorded therein. By reason of azimuth loss, the digital signals recorded in track $b_1$ are not satisfactorily reproduced by head $H_a$ and, similarly, the digital signals recorded in track $a_2$ are not satisfactorily reproduced by head $Hb_1$. As heads $Ha_1$ and $Hb_1$ scan tracks $a_1$ and $b_1$ during this rotation of the rotary head assembly, the digital signals recorded in tracks $a_1$ and $b_1$ are respectively reproduced thereby. When heads $Ha_2$ and $Hb_2$ are positioned to pass across the magnetic tape, as represented by the broken lines in FIG. 4B, the magnetic tape will have been advanced by the distance P, thus positioning head $Ha_2$ on track $b_1$, but extending to adjacent track $a_2$, and thus positioning head $Hb_2$ on track $a_2$, but extending to adjacent track $b_2$. Accordingly, because of azimuth loss, during this pass of heads $Ha_2$ and $Hb_2$ across the tape, digital signals recorded in track $a_2$ are reproduced by head $Ha_2$ and digital signals recorded in track $b_2$ are reproduced by head $Hb_2$. Therefore, at the completion of one rotation of the rotary head assembly, the digital signals recorded in tracks $a_1$, $b_1$, $a_2$ and $b_2$ are reproduced. This compares with the digital signals that were recorded only in tracks $a_1$ and $b_1$ during this one complete rotation of the head assembly.

At the beginning of the next full rotation of the rotary head assembly, heads $Ha_1$ and $Hb_1$ are positioned along tracks $a_2$ and $b_2$. Accordingly, the digital signals recorded in these tracks are reproduced. At the completion of this pass of the heads $Ha_1$ and $Hb_1$ across the magnetic tape, the tape will have been advanced by the distance P and heads $Ha_2$ and $Hb_2$ now are positioned along tracks $b_2$ and $a_3$, respectively. However, head $Ha_2$ is positioned to pick up signals from track $a_3$ and head $Hb_2$ is positioned to pick up signals from track $b_3$. Accordingly, during this pass of heads $Ha_2$ and $Hb_2$ across the magnetic tape, the digital signals recorded in tracks $a_3$ and $b_3$ are reproduced. Consequently, during this second complete rotation of the rotary head assembly, digital signals are recovered from tracks $a_2$, $b_2$, $a_3$ and $b_3$. Here too, it will be appreciated that digital signals are reproduced from twice the number of tracks during unit time period T as were recorded. This is because heads $Ha_2$ and $Hb_2$ are used to reproduce signals, whereas during the recording mode, these heads were not used for recording.

In the aforedescribed extended play and normal play reproducing modes, the magnetic tape is transported at the same speed as was used during the respective recording mode; but the rotary head assembly reproduces digital signals from twice the number of tracks than had been recorded during the unit time period T. For example, during the extended play reproducing mode, digital signals recorded in tracks $a_1$ and $b_1$ are reproduced first by heads $Ha_1$ and $Hb_1$ and then by heads $Ha_2$ and $Hb_2$. During a normal play reproducing mode, digital signals recorded in, for example, tracks $a_2$ and $b_2$ are reproduced first by heads $Ha_2$ and $Hb_2$ and then by heads $Ha_1$ and $Hb_1$. Accordingly, if any defects are present in a portion of the digital signals reproduced by one head, such defects generally may be replaced by the digital signals reproduced the next pass of heads across the magnetic tape. Hence, defects may be avoided, or compensated, without requiring a complex, sophisticated tracking control arrangement. It will be recognized that if defects occur because a record track is not linear, such defects nevertheless are replaced when that track is scanned once again. Since twice the number of tracks are reproduced during the time period T or, stated otherwise, since a given track is subjected to plural (e.g. 2) scans, defective portions present in one scan may be replaced by the same but non-defective portion in the following scan.

Although not shown herein, signals reproduced during an HDTV reproducing mode likewise may be subject to improved reproduction without requiring a complex tracking control arrangement by providing additional sets, or subassemblies, of rotary heads. For example, if an additional subassembly of heads is disposed between the subassemblies shown in FIG. 1A by 90°, and still another subassembly is angularly displaced from this additional subassembly by 180°, thus resulting in four subassemblies of rotary heads, the same effect achieved during extended play and normal play reproducing modes (and described above in conjunction with FIGS. 4A and 4B) is obtained. For example, when providing these two additional subassemblies of rotary heads, the scanning thereby of the tracks having the pattern shown in FIG. 3C is quite similar to the scanning arrangement represented in FIG. 4B. That is, during the time period T, twice the number of tracks are reproduced than were recorded, and a given track is scanned twice.

As another implementation, improved signal reproduction during the HDTV reproducing mode may be attained without requiring a tracking control arrangement simply by rotating rotary head assembly 11 at twice its normal speed only during reproduction. This alternative, however, is not preferred. Rather, one advantage of the system described herein is that the rotary head assembly may be driven at the same, constant speed during both recording and reproduction, even though the original transmission rates of the recorded digital signals vary.

While the present invention has been particularly shown and described with reference to a preferred embodiment, it will be readily appreciated by those of ordinary skill in the art that various changes and modifications may be made without departing from the spirit and scope of the invention. For example, each rotary head subassembly has been described in conjunction with a pair of recording/reproducing heads included therein. If desired, each such subassembly may be formed of three or more heads. Further, while the original transmission rates of the different digital signals have been described in the ratio 1:2:4, other ratios may be used. Preferably, the speed at which the magnetic tape is transported during recording and also during reproduction varies as a function of the original transmission rate of the digital signal that is recorded. Preferably, such transport speeds exhibit the same ratio to each other as do these transmission rates. Still further, the timebase processing of the respective digital signals during a recording operation preferably is related to the original transmission rate of the digital signal; and during a reproducing operation, the timebase processing is inversely related to that used during recording. As described herein, the digital signals are subjected to timebase compression during recording and to timebase expansion during reproduction. As a result, the data rate at which the digital signals are presented to the rotary head assembly for recording is substantially constant, even though the original transmission rates of these digital signals may have varied.

It is intended that the appended claims be interpreted as including the specific embodiments described herein, the alternatives discussed above and all equivalents thereto.

What is claimed is:

1. Digital signal recording and reproducing apparatus for recording digital signals in successive tracks of given pitch on a record medium and for reproducing digital signals therefrom, comprising:

rotary head means including first and second head assemblies angularly separated by approximately 180° and each comprised of a pair of heads displaced from each other in a direction parallel to the track pitch;

head drive means for rotating said rotary head means at a predetermined rotation speed such that each head assembly makes a pass across said record medium during one rotation of said rotary head means;

input means for selectively supplying digital signals at respectively different original transmission rates exhibiting a predetermined ratio;

timebase processing means for selectively modifying the timebase of the supplied digital signals to produce timebase-modified digital signals exhibiting substantially the same data rate even though the original transmission rates of the selectively supplied digital signals may differ from each other;

coupling means for coupling the timebase-modified digital signals to said rotary head means;

medium drive means operable during a recording mode for driving said record medium at respectively different speeds corresponding to the original transmission rate of the digital signal selectively supplied by said input means, whereby the number of tracks recorded on said record medium during a unit time period T (where T is the time for said rotary head means to make a predetermined number of rotations) corresponds to said original transmission rate, said medium drive means being operable during a reproducing mode for driving said record medium at respectively different speeds corresponding to said original transmission rate of the digital signals to be reproduced, whereby during said time period T, said rotary head means reproduces digital signals from twice the number of tracks than had been recorded during said time period T;

memory means for storing the digital signals reproduced by said rotary head means; and recovery means coupled to said memory means for recovering therefrom the digital signals at the original transmission rate.

2. The apparatus of claim 1 wherein said predetermined ratio exhibited by said original transmission rates is 1:2:4.

3. The apparatus of claim 1 wherein said input means selectively supplies extended play digital video signals, normal play digital video signals and HDTV digital video signals at original transmission rates in the ratio 1:2:4, respectively.

4. The apparatus of claim 3 wherein said medium drive means drives said record medium during recording and reproducing modes at speeds in the ratio 1:2:4 to record and reproduce the extended play, normal play and HDTV digital video signals, respectively.

5. The apparatus of claim 3 wherein said timebase processing means modifies the timebase of the selectively supplied extended play, normal play and HDTV digital video signals, respectively, in the ratio 1:2:4.

6. The apparatus of claim 5 wherein said timebase processing means reduces the period of the extended play digital video signals by ¼ and reduces the period of the normal play digital video signals by ½, thereby producing timebase-modified digital signals of substantially constant data rate equal to that of the HDTV digital video signals.

7. The apparatus of claim 3 wherein the record medium is driven at respective speeds to record the extended play, normal play and HDTV digital video signals in a number of tracks per unit time period T having the ratio 1:2:4, respectively.

8. The apparatus of claim 7 wherein the extended play digital video signals are recorded in two tracks per unit time period T, the normal play digital video signals are recorded in four tracks per unit time period T, and the HDTV digital video signals are recorded in eight tracks per unit time period T.

9. The apparatus of claim 7 wherein said coupling means couples the timebase-modified extended play digital video signals to one of said head assemblies at alternate passes thereof across said record medium, said coupling means couples the timebase-modified normal play digital video signals to one of said head assemblies at each pass thereof across said record medium, and said coupling means couples the timebase-modified HDTV digital video signals to a respective one of said first and second head assemblies as each passes across said record medium.

10. The apparatus of claim 1 wherein said input means includes bit reduction means for reducing the number of bits included in the selectively supplied digital signals.

11. The apparatus of claim 5 wherein said recovery means includes timebase restoring means for restoring the timebase of reproduced extended play, normal play and HDTV digital video signals in the ratio 4:2:1, respectively.

12. The apparatus of claim 6 wherein said recovery means includes timebase restoring means for restoring the reproduced extended play, normal play and HDTV digital video signals to their original periods.

13. The apparatus of claim 1 wherein said rotary head means further includes third and fourth head assemblies angularly separated from each other by 180° and from said first and second head assemblies by 90° and each comprised of a pair of heads displaced from each other in a direction parallel to the track pitch operable during a reproducing mode for reproducing digital signals from said tracks.

14. The apparatus of claim 8 wherein said medium drive means drives said record medium at a speed for reproducing extended play digital video signals such that said first and second head assemblies reproduce digital signals from the same pair of tracks during one rotation of said rotary head means, and said drive means drives said record medium at a speed for reproducing normal play digital video signals such that the first head assembly reproduces digital signals from the same pair of tracks during one rotation of said rotary head means as are reproduced by the second head assembly during the next rotation of said rotary head means.

15. The apparatus of claim 10 wherein said recovery means includes bit restoration means for restoring the original number of bits to the digital signals recovered from said memory means.

16. Digital signal reproducing apparatus for reproducing from successive tracks of given track pitch on a record medium digital signals that had different original transmission rates and that had been recorded in a number of tracks during a unit time period T, said number differing with the original transmission rate of the digital signals, said apparatus comprising:
- rotary head means including first and second head assemblies angularly separated by approximately 180° and each comprised of a pair of heads displaced from each other in a direction parallel to the track pitch for reproducing digital signals from said tracks;
- head drive means for rotating said rotary head means at a predetermined rotary speed such that the unit time period T is the time for said rotary head means to make a predetermined number of rotations;
- medium drive means for driving said record medium at respectively different speeds corresponding to the original transmission rate of the digital signals to be reproduced, whereby during said time period T, said rotary head means reproduces digital signals from twice the number of tracks than had been recorded during said time period T;
- memory means for storing the digital signals reproduced by said rotary head means; and
- recovery means coupled to said memory means for recovering therefrom the digital signals at the original transmission rate.

17. The apparatus of claim 16 wherein the original transmission rate of the recorded digital signals was one of three rates exhibiting the ratio 1:2:4

18. The apparatus of claim 16 wherein the recorded digital signals comprise extended play, normal play or HDTV digital video signals having an original transmission rate in the ratio 1:2:4, respectively.

19. The apparatus of claim 18 wherein said rotary head means reproduces the extended play, normal play and HDTV digital video signals at substantially the same data rate.

20. The apparatus of claim 18 wherein said medium drive means drives said record medium at speeds in the ratio 1:2:4 for reproducing the extended play, normal play and HDTV digital video signals, respectively.

21. The apparatus of claim 20 wherein the recorded digital signals had been timebase-modified for recording at a substantially constant data rate; and said recovery means includes timebase restoring means for restoring the timebase of reproduced extended play, normal play and HDTV digital video signals in the ratio 4:2:1, respectively.

22. The apparatus of claim 21 wherein the original periods of the recorded extended play, normal play and HDTV digital video signals had been reduced in the ratio 4:2:1 for recording at the data rate of said HDTV digital video signal, and said timebase restoring means restores the reproduced extended play, normal play and HDTV digital video signals to their original periods.

23. The apparatus of claim 18 wherein said rotary head means further includes third and fourth head assemblies angularly separated from each other by 180° and from said first and second head assemblies by 90° and each comprised of a pair of heads displaced from each other in a direction parallel to the track pitch for reproducing digital signals from said tracks.

24. The apparatus of claim 18 wherein said medium drive means drives said record medium at a speed for reproducing extended play digital video signals such that said first and second head assemblies reproduce digital signals from the same pair of tracks during one rotation of said rotary head means, and said drive means drives said record medium at a speed for reproducing normal play digital video signals such that the first head assembly reproduces digital signals from the same pair of tracks during one rotation of said rotary head means as are reproduced by the second head assembly during the next rotation of said rotary head means.

25. The apparatus of claim 16 wherein the recorded digital signals exhibit a reduced number of bits with respect to the original digital signals, and said recovery means includes bit restoration means for restoring the original number of bits to the digital signals recovered from said memory means.

* * * * *